United States Patent [19]

Haghiri-Tehrani et al.

[11] Patent Number: 4,506,915
[45] Date of Patent: Mar. 26, 1985

[54] IDENTIFICATION CARD WITH A RELIEF-TYPE SURFACE AND A PROCESS FOR PRODUCING THE SAME

[75] Inventors: Yahya Haghiri-Tehrani; Joachim Hoppe, both of Munich, Fed. Rep. of Germany

[73] Assignee: GAO Gesellschaft fur Automation und Organisation mbH, Munich, Fed. Rep. of Germany

[21] Appl. No.: 444,963

[22] Filed: Nov. 29, 1982

Related U.S. Application Data

[63] Continuation of Ser. No. 82,267, Oct. 5, 1979, abandoned.

[30] Foreign Application Priority Data

Oct. 18, 1978 [DE] Fed. Rep. of Germany ....... 2845400

[51] Int. Cl.³ .............................................. B42D 15/00
[52] U.S. Cl. ...................................... 283/75; 283/94; 283/108; 283/109; 283/111; 283/904
[58] Field of Search ................... 283/94, 98, 109, 110, 283/900, 904, 75, 108, 111; 156/227

[56]        References Cited
     U.S. PATENT DOCUMENTS 3,069,793  12/1962  Daniel L. Francescon
3,152,901  10/1964  James R. Johnson
3,457,661  7/1969   Alec Paters
3,461,581  8/1969   Robert Hoffmann
3,480,591  3/1976   Leon L. bildusas
3,533,176  10/1970  Weitzberg ................. 40/2.2
3,581,416  6/1971   Andrews ................... 40/212
3,582,439  6/1971   Thomas .................... 283/7 X
3,871,119  3/1975   Mayer .................... 283/109 X
3,897,964  8/1975   Oka et al. .............. 283/904 X
3,930,924  1/1976   Oka ...................... 283/7 X
3,967,400  7/1976   Otto ..................... 40/2.2
4,079,673  3/1978   Bernstein .............. 283/8 R X
4,092,449  5/1978   Bernstein ............... 283/904
4,151,667  5/1979   Idelson .................. 283/7 X
4,325,196  4/1982   Gauch et al. ............ 283/94 X

FOREIGN PATENT DOCUMENTS 1,079,835  8/1967   Great Britain .
1,100,423  1/1968   Great Britain .
1,265,483  3/1972   Great Britain .
1,564,311  4/1969   France .
2160732   10/1972   Fed. Rep. of Germany .
2,262,162  8/1973   Germany .
2308876    9/1973   Fed. Rep. of Germany .
2,301,059 10/1976   France .
2756692   12/1977   Fed. Rep. of Germany .

Primary Examiner—Paul A. Bell
Attorney, Agent, or Firm—Neuman, Williams, Anderson & Olson

[57]               ABSTRACT

Disclosed is a multilayer identification card with a transparent protective cover film made of plastic. The film is provided with a steel gravure print relief and affixed by cold adhesion to the basic unit of the identification card so that the steel gravure print remains manually fixable.

7 Claims, 6 Drawing Figures

IDENTIFICATION CARD WITH A RELIEF-TYPE SURFACE AND A PROCESS FOR PRODUCING THE SAME

This is a continuation of application Ser. No. 082,267 filed Oct. 5, 1979, now abandoned, hereby incorporated by reference.

BACKGROUND OF THE INVENTION

This invention relates to a multilayer identification card with a relief-type surface as well as to a process for producing the same.

DESCRIPTION OF THE PRIOR ART

Apart fom the smooth identification cards in general use which are provided with a paper inlay, identification cards also exist with a relief-type surface which are provided, for example, with a steel gravure print similar to a bank note. The latter cards offer decisive advantages are compared to other cards. On the one hand, they offer considerable reliability against forgery due to the steel gravure printing process which is difficult to imitate and is extremely expensive and, on the other hand, the safety imprint can be inspected visually and manually in a very easy manner, thereby facilitating a very simple authenticity examination of the card.

German publication print DE-AS 2,308,076 already reveals an indentification card. In this case, a special-purpose security-type paper is embedded between two cover foils such that the surface relief of the special-purpose paper, caused by the watermark, safety threads and especially by the steel gravure point, can be felt and examined on the plasticized surface of the identification card.

Compared to smooth identification cards, such a card is advantageous in that imitation of the same by unauthorized persons is rendered almost impossible owing to the high technical expenditure required to produce the special-purpose security-type paper and in that it is easily possible to examine the authenticity hallmarks without any additional auxiliary means. The disadvantage, however, is that, to produce the card, it is necessary to use a laminating process which compresses the individual layers under high pressure and the auxiliary action of heat, the result being that the relief structure of the steel gravure print loses somewhat in quality.

German laying-open print DE-OS 2,756,692 reveals another identification card provided with a paper inlay. The otherwise flat surface of the card has a signature strip in the upper margin which is provided with a steel gravure print similar to a bank note. The identification card is also produced in a hot lamination process, the signature strip being embedded into the thermoplastic cover foil so as to leave no seams or edges. In spite of specially equipped lamination plates, which are intended to protect the relief structure of the signature strip, a slight loss or deterioration in the quality of the steel gravure print of course cannot be excluded completely.

In addition to the identification cards provided with a paper inlay, so-called solid plastic cards have long been known which are produced predominantly of thermoplastics due to the good lamination properties and the homogeneous fusion of the individual layers. In the case of such cards, any steel gravure print relief which happened to be present is destroyed completely during the lamination process due to the low heat and low pressure required for the lamination process, since this heat and pressure causes a rapid softening of the individual layers. Although there has long been a demand to protect solid plastic cards, which make up a considerable share of the identification cards in circulation, from forgery with a commensurate expenditure by means of a steel gravure surface relief, this has hitherto been impossible due to the lack of suitable manufacturing processes.

Although it is possible in principle to provide identification cards which have already been laminated with a steel gravure print relief directly in a steel gravure printing apparatus at a later time. However, due to the very high pressures which are unavoidable during the steel gravure printing process, however, it is inevitable that the rear side of the identification card will have a wavy surface after the printing operation which is disadvantageous especially in the case of identification cards intended for automats. This is because the magnetic track which as a rule is applied to the card during an earlier operation is deformed during the printing operation, thereby rendering it useless in compliance with current standards. Hence, a universal provision of arbitrary identification cards with almost any surface relief is not possible in case of such a process.

Apart from the advantageous steel gravure printing process, another printing process has long been known which also produces a relief-type surface. The relief-type raised areas, however, are obtained with the aid of chemical foaming processes after the actual printing operation. This printing process, however, must be excluded as a possibility for protecting identification cards from forgery, since it can be imitated with simple means which are accessible to anyone.

Since the steel gravure printing process exhibits in audition to other characteristic features so-called diagonal color segments, i.e. oblique color transitions which cannot be realized with any other printing process, this feature alone constitutes a simple means of differentiating the printed images of both printing processes.

SUMMARY OF THE INVENTION

The object of the invention is thus to provide a process for producing identification cards which allow both solid plastic cards as well as identification cards equipped with a security paper inlay to be provided with a steel gravure print surface relief of unimpaired quality with an acceptable economic expenditure, thereby also rendering the process suitable for mass production lots, without abandoning the safety advantages of the known identification cards.

This object is accomplished in accordance with the invention by the features cited in the characterizing clause of the main claim.

The subclaims reveal further developments of the invention.

The invention is based on the concept that the printed information on an identification card fulfills in part very different functions and is thus exposed or subject to attacks of a very different nature.

The client-oriented data on the card which include, for instance, the card number, the account number, the client's name, address and the like and which vary from card to card, are the data most likely to be forged. The counterfeiting measures are limited substantially to changing the existent data or adapting the card data to the data on other media employed for the fraud such as receipts and the like. The client-oriented data are as a rule applied to the identification card by means of commercial writing or printing devices and are predominantly positioned in an externally visible, inaccessible inner layer of the cards in order to prevent manipulation so that it is impossible to obtain access to these data.

To forge these data, it is necessary on the one hand to expose the data-carrying layer and, on the other hand, to imitate the lettering and pattern of the print. If the data are coded, it is necessary as well to obtain the code and to use it when forging the data.

In order to prevent total or complete forgeries of identification cards, they are also equipped with many various authenticity hallmarks which, depending on the use of the card, are adapted to be rendered and inspected visually, manually and/or by machine. As already mentioned above, those features in particular which can be imitated only with a high technical expenditure, on the one hand, and which on the other hand can be inspected visually and/or manually without any auxiliary means are the features which have proved themselves in particular for daily use.

A feature which is advantageous in this context is steel gravure printing which affords a high degree of reliability from forgery due to the very fine lining, which requires special manual and artistic skill to produce, by the possibility of placing different colors in very fine lines very close to one another in an intentional pattern, by the possibility of producing diagonal color segments, i.e. diagonal color transitions, and due to the characteristic surface relief.

In order to obviate misunderstandings during the authenticity inspection, those authenticity features in particular which can be inspected visually, including the very fine and complicated structure of the steel gravure pattern, are preferably applied in the same manner to all cards of a particular class or series.

The features provided for general authenticity inspection very frequently perform their function as a safeguard to forgery solely due to their type, nature, design and structure, even without any additional safeguarding measures. It is not necessary per se to position such a feature in an inner card layer, since forging such a feature does not yield any advantage. Nevertheless, it is customary to position both the variable, client-specific data and the authenticity hallmarks not subject to forgery in the interior of the card. This has proved to be advantageous as general protection from wear and damage, in particular in the case of features which react in a sensitive way to environmental conditions. Placing the steel gravure pattern in the interior of the card, however, is not necessary owing to its good resistance to environmental factors which is well known in the case of bank notes, for example. In addition, this is considerably disadvantageous, since the surface relief, which is almost impossible to imitate, is withdrawn completely from examination or its quality is diminished just like the afore-mentioned prior art identification card. The selective position of the steel gravure pattern, which cannot be forged with reasonable expenditure, on the outer side of the card with the aid of the inventive production process opens up new fields of applications which were hitherto inaccessible for this feature and also exhausts the existing feature properties in an improved manner.

It has proved to be especially advantageous if all types of identification cards (solid plastic cards, paper inlay cards and the like) can be equipped with steel gravure print surface reliefs in a uniform operation by means of the inventive production process. Since the steel gravure print surface reliefs are not subject to any heat during the production of the card according to the inventive methods, the quality of these reliefs is not impaired during the lamination process.

In spite of the ease of manufacture of the cards, a high resistance to forgery is still ensured due to the further developments of the invention as recited in the subclaims which make it impossible to remove and reuse the cover foil.

BRIEF DESCRIPTION OF THE DRAWING

Embodiments of the invention will be described in the following by way of example with reference to the drawing, in which.

DESCRIPTION OF PREFERRED EMBODIMENTS

Figure 1:
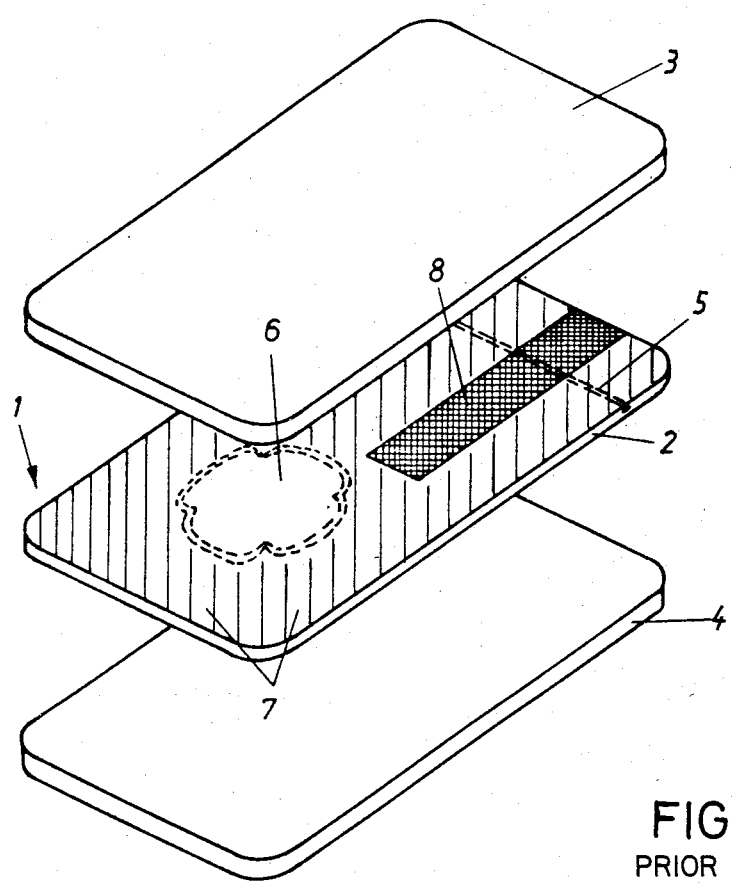
FIG. 1 is a view in perspective of a paper-laminated identification card.

FIG. 1 illustrates a known smooth identification card. As the figure reveals, the card 1 consists of an upper and lower foil cover layer 3, 4 between which is located a printed paper form 2. The foil cover layers 3,4 serve to protect the paper form 2 and impart the necessary stability to the card. The paper form 2 is produced from high-quality, special-purpose paper which has a steel gravure pattern 7, a watermark 6 as well as a safety thread 5 embedded in the paper. Moreover, client-specific card data 8 are printed onto the special-purpose paper in addition to the printed information applied by steel gravure technology which is preferably limited to pictorial representations, background grids and the like. The client-specific data are printed on the paper in simple planographic printing technology, e.g. with the aid of a high-speed printer. In order to finish the card, the individual layers 2, 3 and 4 are pressed together under high pressure and the simultaneous action of heat. In combining the individual layers, the paper form is bonded so securely to the cover layers 3,4 that it is no longer possible to gain access to the printed information without leaving traces of manipulation on the card.

Figure 2:
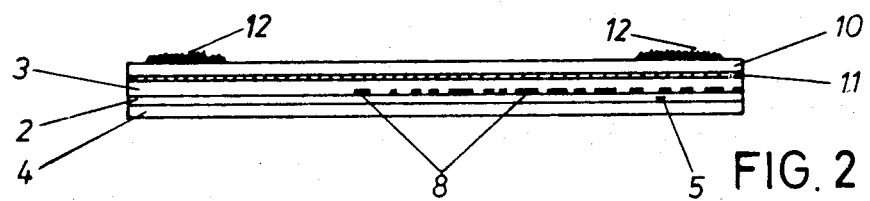
FIG. 2 is a sectional view through the inventive identification card with a paper-laminated basic unit.

FIG. 2 shows a paper inlay identification card produced according to the inventive manufacturing process in which a special-purpose paper 2 is laminated between two cover foils 3 and 4.

In analogy to the known identification cards, the client-specific data are applied, if desired, to both sides of the inner card layer 2 in this type of card and are thus prevented from being influenced by any attempts to forge the data. The safety pattern 12 which determines the total impression and which is performed by the steel gravure printing technique, by contrast, is applied directly, at least in part, to the surface of an additional cover foil 10. This causes the surface relief 12 formed by the gravure print to take on a very marked appearance. The steel gravure print relief 12 is directly accessible, since it is positioned on the outer surface of the card. However, since any manipulation of this print pattern with the intent to fraud would not yield any advantages for the forger, manipulation of this print pattern alone is not expected. Due to the high technical expenditure necessary to produce the surface relief as well as to inspect the same in a simple manner, the inventive identification card illustrated in FIG. 2 is protected from complete forgery in a very effective way.

In contrast to known production processes in which, as already mentioned, all layers of a card to be combined are fused together after all printed information has been applied to the information carrier 2 by the action of heat and pressure during a lamination process, only the basic card structure, consisting of layers 2, 3 and 4, for example, is initially produced according to known process steps in a first operation according to the inventive method. This basic card structure, however, is only provided in part with the print pattern relating to the design of the card.

Figure 3:
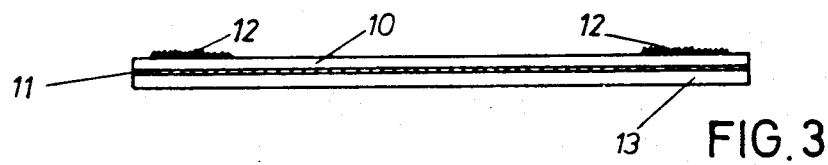
FIG. 3 is a sectional view of the relief foil with a protive layer.

During a process which, if desired, can occur simultaneously, the transparent cover foil 10 is provided with a steel gravure relief 12 which supplements or complements the print image on the basic card structure. The foil 10 has on its underside an adhesive layer 11 which serves to join the cover foil 10 and the basic card structure 2,3,4 as shown in FIG. 2 in such a way that the foil is irreversibly deformed and thus rendered useless if an attempt is made to separate the layers. The adhesive layer 11, as shown in FIG. 3, is provided with a protective layer 13 consisting of a substrate with low adhesive capacity such as silicone paper, for instance, in order to protect both the adhesive layer 11 on the foil as well as the device elements required to process it during the printing operation and all preparatory measures from dirt, damage and the like. Furthermore, this adhesive layer is provided for reasons of better printability and troublefree storage of the foils 10.

When joining the basic card structure and the gravure printed foil to form the identification card shown in FIG. 2, the protective layer 13 is initially removed from the foil 10. The foil 10 provided with the steel gravure print is thereupon cold-laminated onto the basic card structure 2,3,4 with the aid of a roll pair, for instance, so that the relief of the gravure print 12 is retained in its full quality.

In order to prevent the cover foil 10 provided with the steel gravure print 12 from being separated from a finished identification card and applied to another basic unit, the foil 10 and the adhesive layer 11 are matched to one another such that the adhesive strength of the adhesive layer 11 is substantially greater than the tensile strength of the foil. If the foil 10 is mechanically separated from the basic card structure, the foil, depending on its nature, will either be able to be removed only in fragments or will be stretched and deformed such that reuse is out of the question.

It is readily possible for the person skilled in the art to select the foils and adhesive layers complying with the aforementioned requirements from the number of known materials without making any inventive achievement himself. A cover layer which is self-destructive upon separation can be achieved, for instance, using a thin cellophane foil and a layer, which merely deforms, together with a thin PVC foil (polyvinyl chloride). A commercial acrylic adhesive can be used as the adhesive.

Figure 4:
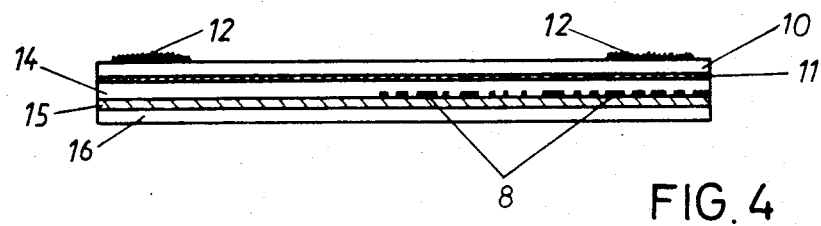
FIG. 4 is a sectional view through the inventive identification card with a solid plastic basic unit.

FIG. 4 illustrates another solid plastic identification card produced in accordance with the inventive process. The basic card structure in this case consists of the transparent foil cover layers 14 and 16 with a dyed foil 15 sandwiched therebetween. The opaque foil 15, which is laminated between the cover foils, is printed on one or both sides with the client-specific data 8 and can also be provided with general patterns relating to the total image of the card. An additional foil 10 which has been provided with the advantageous steel gravure print 12 is now cold-laminated onto this three-ply basic structure—as already mentioned—in a very easy manner with the aid of the recited process. Hence, solid plastic cards can be equipped with steel gravure print reliefs which are extremely difficult to imitate, but which can be inspected with simple means in the same manner as described above irrespective of the structure and nature of the foils 14,15,16, thereby protecting such cards from total or complete forgery.

Figure 5:
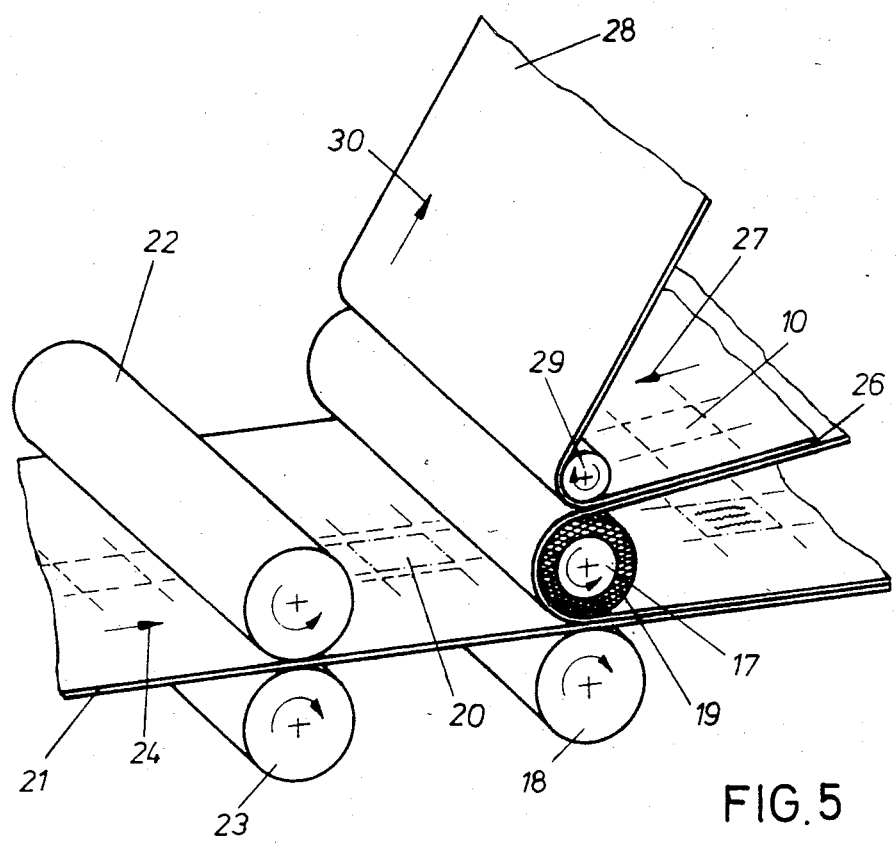
FIG. 5 is a device for producing the inventive indentification card with a self-adhering relief foil.

A process for applying the card support provided with a steel gravure print is explained briefly in the following with reference to the highly schematic FIG. 5. As this figure illustrates, the basic card unit, which can consist of elements 3,2,4 of FIG. 1, for instance, and the cover foil (FIG. 3), which is adapted or matched to the dimensions of the basic unit and is provided with a steel gravure print relief . The elements are processed in the form of so-called multi-use sheets. The actual "laminating device" consists of the calender rolls 17,1. Roll 17 is provided with a resilient coating, e.g. a hard rubber layer 19. The multi-use sheet 21 supporting the basic card unit 20 is supplied to the calender rolls 19,18 in the direction of arrow 24 with the aid of two transport rolls 22,23. At the same time, the multi-use sheet 26 provided with the relief foils 10 is supplied to the calender rolls in the direction of arrow 27. Before the sheet enters the roll pair, the protective layer 28 is removed in the direction of arrow 30 with the aid of a reversal roll 29 so that the multi-use sheet provided with the relief foils comes to lie with its adhesive layer on the underlying sheet 21. Once the mutual positioning and alignment of the multi-use sheets has been adjusted, all relief foils 10 will pass through the calender rolls which press the sheets 26,21 together, thereby permanently joining them with the respective basic card units 20 in a good fit.

During a last operation, the identification cards are punched out of the fused multi-use sheets in a known manner.

In addition to the afore-cited production process, it is also possible to initially provide a non-self-adhesive foil with a relief print and to then apply the adhesive layer to one of the surfaces involved immediately before the relief foil and the basic card unit are pressed together. The adhesive in this case can be a commercial adhesive, e.g. a two-component adhesive, which when used in processing thicker foils ensures that the foil will be irreversibly deformed should an attempt be made to separate it from the basic card unit.

Figure 6:
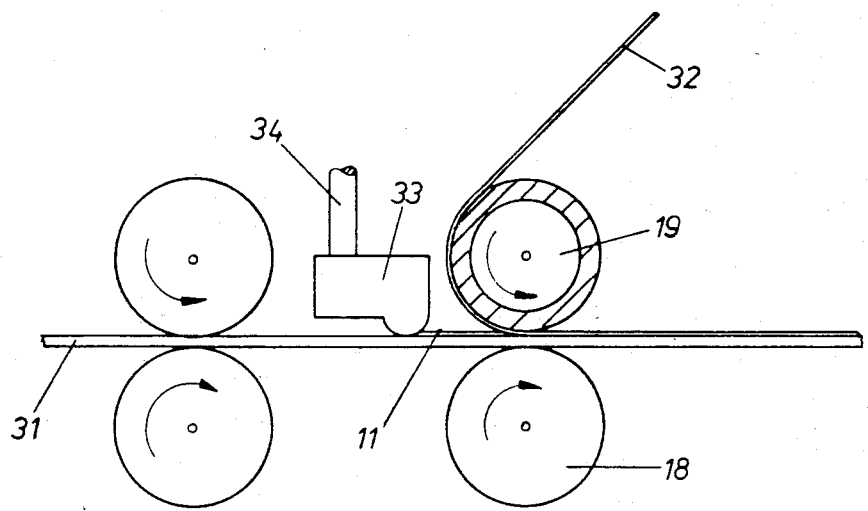
FIG. 6 is a device for producing identification cards with non-self-adhering relief foil.

The latter process is explained briefly with reference to FIG. 6 which shows how the adhesive is applied to the surface of the web 31 immediately before the webs 31 and 32 to be joined enter the nip formed by rolls 18,19. The adhesive 11 is applied in the illustrated case according to the known extruder method, for example, and a broad-slot dispenser head 33 is employed which is connected to a metering pump (not shown) via a supply line 34.

What is claimed is:

1. A multi-layer identification card comprising a card layer for carrying at least part of the information the card provides on one surface of said card layer; a transparent, protective plastic film covering all of the one surface of said card layer; an adhesive layer securing said card layer one surface to the said protective plastic film; the adhesive strength of the adhesive layer being greater than the tensile strength of the protective plastic film, whereby the film is irreversibly destroyed if removed from the card layer; steel gravure printing formed on the exterior surface of the protective plastic film prior to engagement of said film with said card one layer; said printing being highly visible and readily sensed by touch for verification purposes; the original relief present in said steel gravure printing of said transparent sheet being substantially unchanged in said indentification card after said transparent film covering is secured to said card layer one surface.

2. The identification card of claim 1 in which said steel gravure printing comprises diagonal color segments providing color transitions.

3. The identification card of claim 1 in which said card is multilayered and at least one of such layers is formed of paper.

4. The identification card of claim 1 in which said card is formed entirely of plastic.

5. The identification card of claim 1 in which said protective film is formed of cellophane and said adhesive layer comprises an acrylic plastic.

6. The identification card of claim 1 in which the protective film is secured to said layer by an adhesive and the resistance of the protective film to irreversible distortion is less than the strength of the adhesive.

7. The identification card of claim 1 in which said protective film is formed of polyvinyl chloride and said adhesive is acrylic-based.

* * * * *